United States Patent [19]
Yabuki et al.

[11] Patent Number: 6,130,296
[45] Date of Patent: *Oct. 10, 2000

[54] GOLF BALL

[75] Inventors: Yoshikazu Yabuki, Shirakawa; Kuniyasu Horiuchi, Kobe, both of Japan

[73] Assignee: Sumitomo Rubber Industries, Ltd., Hyogo-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/884,627

[22] Filed: Jun. 27, 1997

[30] Foreign Application Priority Data

Jun. 28, 1996 [JP] Japan .................. 8-188106

[51] Int. Cl.⁷ .................. A63B 37/12
[52] U.S. Cl. .................. 525/221; 525/201; 473/365; 473/372; 473/378; 473/385
[58] Field of Search .................. 525/201, 221; 473/365, 372, 378–385

[56] References Cited

U.S. PATENT DOCUMENTS 5,688,869  11/1997  Sullivan .................. 525/196
5,691,418  11/1997  Hagman .................. 525/221

FOREIGN PATENT DOCUMENTS

| | | |
|---|---|---|
| 2276628 | 10/1994 | United Kingdom . |
| 2288603 | 10/1995 | United Kingdom . |
| 2302330 | 1/1997 | United Kingdom . |
| 2302546 | 1/1997 | United Kingdom . |
| 2311293 | 9/1997 | United Kingdom . |
| 00212 | 1/1995 | WIPO . |
| 97/02318 | 1/1997 | WIPO . |

*Primary Examiner*—David Buttner
*Attorney, Agent, or Firm*—Birch, Stewart, Kolasch & Birch, LLP

[57] ABSTRACT

The present invention provides a golf ball having good shot feel, good controllability, high rebound characteristics and good flight performance. The golf ball of the present invention is composed of a core and a cover covering the core, wherein the cover contains an ionomer, prepared by neutralizing a terpolymer of ethylene, acrylic or methacrylic acid and an acrylic ester with magnesium ion, in an amount of 5 to 100% by weight based on the total resin amount of the cover.

6 Claims, 1 Drawing Sheet

GOLF BALL

FIELD OF THE INVENTION

The present invention relates to a golf ball. More particularly, it relates to a golf ball having good shot feel, good controllability, high rebound characteristics and good flight performance.

BACKGROUND OF THE INVENTION

The cover of golf balls has been generally formed from ionomer resin (e.g. Japanese Patent Kokoku Publication No. 49-27093). Particularly, in a two-piece solid golf ball using a solid core, the ionomer is exclusively used as the cover. The reason is that the ionomer is superior in durability, cut resistance and rebound characteristics and is easily processed.

The ionomer is generally a copolymer of an olefin monomer and an $\alpha,\beta$-ethylenic carboxylic acid of which a portion of carboxylic acid groups is neutralized with metal ion. However, the ionomer is inferior in shot feel and controllability (ease of spinning) to a balata (transpolyisoprene) cover for a multi-layer structure golf ball having a thread rubber layer because of high hardness and high rigidity.

Softening the ionomer has been considered for improving the shot feel and controllability in this field.

For example, Japanese Patent Kokai Publication Nos. 1-308577 and 5-3931 suggest that a soft ionomer which is prepared by neutralizing a terpolymer of an $\alpha$-olefin, an unsaturated carboxylic acid (e.g. acrylic acid, methacrylic acid, etc.) and an acrylate ester with sodium ion or zinc ion high rigid ionomer is blended or mixed with the above mentioned hard type ionomer, which improves the shot feel and controllability of golf balls.

However, even if the above soft ionomer is blended, the shot feel similar to the balata covered golf ball has not been obtained. The blend of the soft ionomer adversely affects on rebound characteristics and flight performance. The blend of the soft ionomer is considered by the art to be insufficient.

OBJECTS OF THE INVENTION

Under the above circumstances, the present inventors have intensively studied about the resin used as the cover so as to satisfy not only shot feel and controllability, which are similar to the balata-covered golf ball, but also excellent flight performance, on the basis of ionomer. As a result, it has been found that an ionomer prepared by neutralizing a terpolymer of ethylene, acrylic or methacrylic acid and an acrylate ester with a magnesium ion is contained in an amount of 5 to 100% by weight based on the total resin amount of the cover, there can be obtained a golf ball having good shot feel and controllability, high rebound characteristics and good flight performance. Thus, the present invention has been completed.

An object of the present invention is to solve the above problems in the prior art, thereby providing a golf ball having good shot feel and controllability, high rebound characteristics and good flight performance.

This object as well as other objects and advantages of the present invention will become apparent to those skilled in the art from the following description with reference to the accompanying drawing.

BRIEF DESCRIPTION OF DRAWINGS

The present invention will become more fully understood from the detailed description given hereinbelow and the accompanying drawings which are given by way of illustration only, and thus, are not limitative of the present invention and wherein.

SUMMARY OF THE INVENTION

Figure 1:
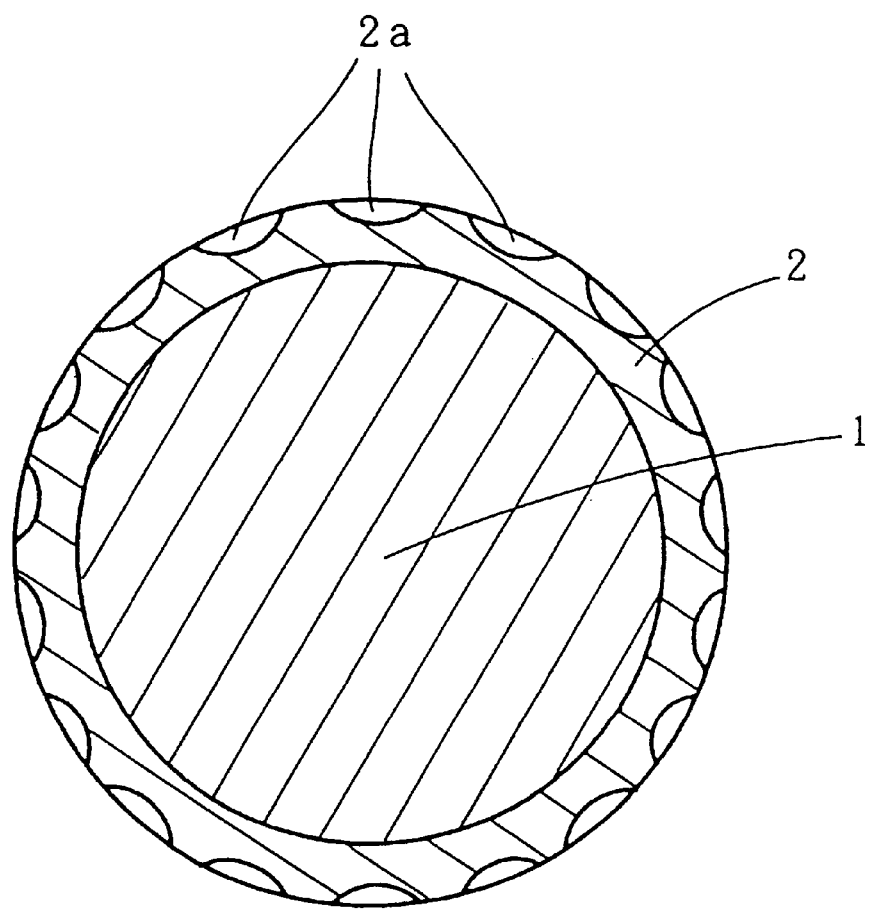
FIG. 1 is a schematic cross section illustrating one embodiment of the golf ball of the present invention.

The present invention provides a golf ball which comprises a core and a cover encapsulating the core, wherein the cover contains an ionomer, prepared by neutralizing a terpolymer of ethylene, acrylic or methacrylic acid and an acrylic ester with magnesium ion, in an amount of 5 to 100% by weight based on the total resin amount of the cover.

The present invention also provides a golf ball which comprises a core and a multi-layered cover encapsulating the core, wherein the one of the cover layers contains an ionomer, prepared by neutralizing a terpolymer of ethylene, acrylic or methacrylic acid and an acrylic ester with magnesium ion, in an amount of 5 to 100% by weight based on the total resin amount of the cover.

DETAILED DESCRIPTION OF THE INVENTION

The ionomer, which is prepared by neutralizing a terpolymer of ethylene, acrylic or methacrylic acid and an acrylate ester with magnesium ion, will be called herein ionomer A for distinguishing the other ionomer used hereinafter. The ionomer A shows high rebound in comparison with a soft type ionomer conventionally known, such as Surlyn 8320 (trade name) (Na) and Surlyn 9320 (trade name) (Zn), although hardness and stiffness modulus are in the same level. This ionomer, when used as the cover of golf balls, provides a golf ball with good shot feel, good controllability, high bound characteristics and goof flight performance. It is noted that Na, Zn, etc., which are described in parentheses at the back of the trade name of the above ionomer resin show neutralization metal ion species, respectively.

The ionomer A is contained in an amount of 5 to 100% by weight based on the total resin amount of the cover. When the amount of the ionomer A is less than 5% by weight based on the total resin amount of the cover, the technical effect of providing good shot feel, good controllability, high rebound characteristics and good flight performance is not sufficiently exhibited. It is preferred that the amount of the ionomer A is from 10 to 95% by weight based on the total resin amount of the cover.

The resin constituting the resin components of the cover, other than the ionomer A, includes an ionomer which has hitherto been used as the resin for cover and will be called herewith "ionomer B" for distinguishing the above ionomer A, a thermoplastic elastomer, a polar group-modified thermoplastic elastomer and the like.

Examples of the ionomer B, which has hitherto been used, are ionomers commercially available from Mitsui Du Pont Polychemical Co., Ltd., such as Hi-milan 1605, (Na), Hi-milan 1707 (Na), Hi-milan AM7318 (Na), Hi-milan 1706 (Zn), Hi-milan AM7315 (Zn), Hi-milan AM7317 (Zn), Hi-milan AM7311 (Mg), Hi-milan MK7320 (K), etc.; terpolymer ionomers, such as Hi-milan 1856 (Na), Hi-milan 1855 (Zn),Hi-milan AM7316 (Zn), etc.; ionomers commercially available from Du Pont Co., such as Surlyn 8920 (Na), Surlyn 8940 (Na), Surlyn AD8512 (Na), Surlyn 9910 (Zn), Surlyn AD8511 (Zn), Surlyn 7930 (Li), Surlyn 7940 (Li), etc.; terpolymer ionomers such as Surlyn AD8265 (Na), Surlyn AD8269 (Na), etc.; ionomers commercially available from Exxon chemical Co. such as Iotek 7010 (Zn), Iotek 8000 (Na), etc. Na, Zn, K, Li, Mg, etc., which are described in parentheses at the back of the trade name of the above ionomer resin show neutralization metal ion species, respectively. The above mentioned ionomer resin B can be solely used or used in combination. The ionomer resin B may be a combination of one or more ionomer resins neutralized with monovalent metal and one or more ionomers neutralized with divalent metal.

The thermoplastic elastomer may be any one which has been known to the art, but includes polyolefin, polyester, polyamide, polyurethane, styrene-containing polymer (e.g. styrene-butadiene-styrene copolymer or styrene-isoprene-styrene copolymer) etc., or may be used in combination with the ionomer B.

In order to enhance the compatibility with the ionomer A, the thermoplastic elastomer may be modified with polar group, such as maleic anhydride, epoxy group (e.g. glycidyl group), sulfonic acid etc. The polar group-modified thermoplastic elastomer may be used in combination with the non-modified thermoplastic elastomer and/or the ionomer B.

In order to attain good shot feel, good controllability, high rebound characteristics and good flight performance of the golf ball, a Shore-D scale hardness of the ionomer A is preferably from 20 to 50 and a stiffness modulus thereof is preferably from 10 to 50 MPa. It is also preferred that a Shore-D scale hardness of the cover containing the ionomer A is from 35 to 60.

When the Shore-D scale hardness of the ionomer A is less than 20, it is difficult to adjust the hardness of the whole cover to a desired hardness such as Shore D-scale hardness of 35 to 60. Also, the rebound characteristics and cut resistance are deteriorated. On the other hand, when the Shore-D scale hardness of the ionomer A is more than 50, the rebound characteristics are deteriorated and it is difficult to adjust the hardness of the whole cover to a desired hardness such as Shore D-scale hardness of 35 to 60. When the stiffness modulus of the ionomer A is less than 10 MPa, it is difficult to adjust the hardness of the whole cover to a desired hardness such as Shore D-scale hardness of 35 to 60. On the other hand, when the stiffness modulus of the ionomer A is more than 50 MPa, the rebound characteristics are deteriorated and it is difficult to adjust the hardness of the whole cover to a desired hardness such as Shore D-scale hardness of 35 to 60. When the Shore-D scale hardness of the cover containing the ionomer A is less than 35, rebound characteristics are deteriorated and flight performance is also deteriorated and, cut resistance is also deteriorated, because of the cover being too soft. On the other hand, when the Shore-D scale hardness of the cover containing the ionomer A is more than 60, shot feel and controllability are deteriorated because the cover is too hard.

In the present invention, the cover containing the ionomer A may be a single-layer structure cover, or a multi-layered structure cover of one or more layers. In the multi-layer structure cover, the specific layer may be present either in an outer layer or in an intermediate layer and may be at any position.

In the preparation of the cover composition, mixing is generally conducted at 150 to 260° C. for 0.5 to 15 minutes using an internal mixer such as a kneading type twin-screw extruder, a Banbury, a kneader or the like.

It is possible to optionally add various additives such as pigments, dispersants, antioxidants, ultraviolet absorbers, photostabilizers, etc. to the cover composition used for forming a cover.

The golf ball is produced by covering a core with the above cover. The core may be a core for solid golf ball (solid core) or a core for multi-layer structure golf ball having a thread rubber layer (thread wound core).

The solid core may be a single-layer structure core or a multilayer structure core having two or more layers. The single layer solid core for two-piece golf balls can be obtained by, for example, mixing 100 parts by weight of polybutadiene, 10 to 60 parts by weight of one or more vulcanizing agents (crosslinking agents), such as an αβmonoethylenically unsaturated carboxylic acid (e.g. acrylic acid, methacrylic acid, etc.) or a metal salt thereof or a functional monomer (e.g. trimethylolpropane trimethacrylate, etc.), 10 to 30 parts by weight of a filler (e.g. zinc oxide, barium sulfate, etc.), 0.5 to 5 parts by weight of a peroxide (e.g. dicumyl peroxide, etc.) and, if necessary, 0.1 to 1 parts by weight of an antioxidant to form a rubber composition, and press-molding the rubber composition at the temperature of 140 to 170° C. for 10 to 40 minutes in order to obtain a spherical vulcanized article.

The thread wound core is generally composed of a center and a thread rubber wound formed on the center. The center can be a liquid or rubber center. The rubber center can be obtained by vulcanizing the same rubber composition as that of the above solid core.

The thread rubber can be one which have hitherto been used in this field. For example, it can be obtained by vulcanizing a rubber composition which is prepared by mixing a natural rubber or a mixture of a natural rubber and a synthetic polyisoprene with an antioxidant, a vulcanization accelerator and sulfur.

A method of eucapsulatingly to cover the core is not specifically limited, but may be a conventional method. For example, it includes a method of previously molding a cover composition into a semi-spherical half-shell, covering a core with two half-shells, followed by pressure molding at 130 to 170° C. for 1 to 15 minutes, or a method of injection-molding the cover composition directly on the core. The thickness of the cover is generally from about 1 to 4 mm. At the time of cover molding, dimples may be optionally formed on the surface of the golf ball. In addition, a paint or stamping may be optionally provided after cover molding.

FIG. 1 is a schematic cross section illustrating one embodiment of the golf ball of the present invention. The golf ball shown in FIG. 1 is a two-piece solid golf ball comprising a core 1 of a vulcanized molded article of a rubber composition, which is referred to as a solid core, and a cover 2. The core 1 is not limited to a specific one, for example, a vulcanized molded article of a rubber composition comprising polybutadiene as a main material is used. The cover 2 for covering the core contains an ionomer prepared by neutralizing a terpolymer of ethylene, acrylic or methacrylic acid and an acrylate ester with a magnesium ion (ionomer A) is contained in an amount of 5 to 100% by weight based on the total resin amount of the cover. 2a indicates dimples provided on the above cover 2.

In the golf ball shown in FIG. 1, the core 1 is composed of the vulcanized molded article of the single-layer structure rubber composition. For example, it may also be a two-layer structure core wherein an outer core of a vulcanized molded article of a rubber composition comprising polybutadiene as a main material is further formed around an inner core of a vulcanized molded article of a rubber composition comprising polybutadiene as a main material in place of it. The cover 2 may be a single-layer structure cover or a multi-layer structure cover of two or more layers wherein one or more layers contains the ionomer A in an amount of 5 to 100% by weight based on the total resin amount. In a preferred embodiment number of the dimples 2a are optionally provided on the cover 2 so that desired characteristics may be obtained. In addition, painting or marking is optionally provided on the surface of the golf ball.

As described above, according to the present invention, there could be provided a golf ball having good shot feel, good controllability, high rebound characteristics and good flight performance.

EXAMPLES

The following Examples and Comparative Examples further illustrate the present invention in detail but are not to be construed to limit the scope thereof.

Examples 1 to 4 and Comparative Examples 1 to 5

The golf balls of Examples 1 to 4 and Comparative Examples 1 to 3 were produced through the following steps (1) to (3).

(1) Production of core

A solid core was obtained by heating a rubber composition, which was prepared by blending 100 parts by weight of polybutadiene [BR-11 (trade name), manufactured by Japan Synthetic Rubber Co., Ltd.] with 36 parts by weight of zinc acrylate, 20 parts by weight of zinc oxide, 1.5 parts by weight of dicumyl peroxide and 0.5 parts by weight of an antioxidant [Yoshinox 425 (trade name), manufactured by Yoshitomi Seiyaku Co., Ltd.], at 140° C. for 30 minutes, followed by heating at 170° C. for 10 minutes. An average diameter of the resulting core was 38.9 mm. In addition, a hardness measured at the arbitrary part by using a JIS-C type hardness tester was within the range of 78±3.

(2) Preparation of cover composition

Formulation materials of the formulations shown in Tables 1 and 2 were mixed using a kneading type twin-screw extruder to obtain a pelletized cover composition, respectively. An amount of each component shown in the tables is represented as parts by weight. The details of components represented by the trade name in the tables are shown at the back of Table 2. The extrusion conditions are as follows: a screw diameter: 45 mm; a screw revolution per minute: 200 rpm; a screw L/D: 35. The formulation components were heated at 220 to 260° C. at the die position of the extruder.

The stiffness modulus and the Shore D-scale hardness of the resulting cover composition were measured. The results are shown in Tables 1 and 2, together with the formulation of the cover composition. Furthermore, the measuring method of the stiffness modulus and the Shore D-scale hardness are as follows.

Stiffness modulus

The stiffness modulus was measured according to ASTM D-747 after a sheet having a thickness of about 2 mm obtained from each cover composition due to hot-press molding was preserved at 23° C. for two weeks.

Shore D-scale hardness

The hardness of the cover was measured according to ASTM D-2240 after a sheet having a thickness of about 2 mm obtained from each cover composition due to hot-press molding was preserved at 23° C. for two weeks.

TABLE 1

| | Example No. | | | |
|---|---|---|---|---|
| | 1 | 2 | 3 | 4 |
| Hi-milan 1605 ※1 | 25 | 0 | 40 | 15 |
| Hi-milan 1706 ※2 | 25 | 40 | 40 | 0 |
| Surlyn AD 8542 ※3 | 50 | 60 | 20 | 85 |
| Titanium dioxide | 2 | 2 | 2 | 2 |
| Stiffness D-scale hardness | 190 | 130 | 280 | 80 |
| Shore D-scale hardness | 53 | 50 | 58 | 46 |

TABLE 2

| | Comparative Example No. | | | | |
|---|---|---|---|---|---|
| | 1 | 2 | 3 | 4 | 5 |
| Hi-milan 1605 ※1 | 50 | 25 | 0 | 50 | '10 |
| Hi-milan 1706 ※2 | 50 | 25 | 40 | 0 | 0 |
| Surlyn 8320 ※4 | 0 | 50 | 60 | 0 | 60 |
| Hi-milan AM7311 ※5 | 0 | 0 | 0 | 50 | 40 |
| Titanium dioxide | 2 | 2 | 2 | 2 | 2 |
| Stiffness modulus (MPa) | 340 | 190 | 125 | 350 | 130 |
| Shore D-scale hardness | 62 | 52 | 49 | 63 | 50 |

※1: Hi-milan 1605 (trade name)
Ethylene-methacrylic acid copolymer ionomer prepared by neutralizing with sodium ion, manufactured by Mitsui Du Pont Polychemical Co., Ltd., stiffness modulus: 310 MPa, Shore D-scale hardness: 62

※2: Hi-milan 1706 (trade name)
Ethylene-methacrylic acid copolymer ionomer prepared by neutralizing with zinc ion, manufactured by Mitsui Du Pont Polychemical Co., Ltd., stiffness modulus: 260 MPa, Shore D-scale hardness: 61

※3: Surlyn AD8542 (trade name)
Ethylene-methacrylic acid-acrylate terpolymer ionomer prepared by neutralizing with magnesium ion, manufactured by Du Pont Co., stiffness modulus: 35 MPa, Shore D-scale hardness: 44

※4: Surlyn 8320 (trade name)
Ethylene-methacrylic acid-acrylate terpolymer ionomer prepared by neutralizing with sodium ion, manufactured by Du Pont Co., stiffness modulus: about 29 MPa, Shore D-scale hardness: 37

※5: Hi-milan AM7311 (trade name)
Ethylene-methacrylic acid copolymer ionomer prepared by neutralizing with magnesium ion, manufactured by Mitsui Du Pont Polychemical Co., Ltd., stiffness modulus: 304 MPa, Shore D-scale hardness: 62

(3) Production of golf ball

A golf ball having an outer diameter of 42.7 mm and a ball weight of 45.3 g was produced by directly injection-molding the cover composition of the above item (2) on the solid core of the item (1) to cover the solid core of the item (1), and applying a paint to the resulting golf ball.

The ball compression (PGA), rebound coefficient, durability, spin amount at the time of iron shot, run (rolling) due to sand wedge, shot feel at the time of approach and controllability of the resulting golf ball were examined. The results are shown in Tables 3 and 4. The method for the measurement or evaluation of the above rebound coefficient, durability, spin amount at the time of iron shot, run by sand wedge, shot feel at the time of approach and controllability are as follows.

Rebound coefficient:

It is determined by a ball velocity obtained when a cylindrical article having a weight of 198.4 g is allowed to collide with the golf ball at a speed of 45 m/second.

Durability:

After a No. 1 wood club is mounted to a swing robot manufactured by True Temper Co., the golf ball is hit at a head speed of 45 m/second to examine the number of hitting until breakage arises. The results are indicated by an index in case of the impact-resistant number (number of hitting until breakage arises) of Comparative Example 1 as a criterion for comparison being 100.

Spin amount and flight distance:

The spin amount was determined by mounting a No. 5 iron club and No. 9 iron club to the above swing robot manufactured by True Temper Co., separately, hitting the golf ball with each club at a head speed of 38 m/second and 34 m/second, respectively, and taking a photograph of the hit golf ball. The flight distance was determined by mounting a No. 1 wood club to a swing robot manufactured by True Temper Co., hitting the golf ball at a head speed of 45 m/second and measuring the distance to the dropping point (carry).

Run by sand wedge:

The run (rolling distance) of the golf ball measured by hitting with the sand wedge onto the green from the position, which is 60 yards away from the end of the green.

Shot Feel at the Time of Approach:

It is evaluated by a practical hitting test using a pitching wedge according to 10 top professional golfers. The evaluation criteria are as follows. The results shown in the Tables below are based on the fact that not less than 8 out of 10 professional golfers evaluated with the same criterion about each test item.

Evaluation Criteria:

○: Soft and good

Δ: Slightly hard x: Hard and poor xx: Further hard and very poor

Controllability at the Time of Approach:

It is evaluated by practically hitting with a pitching wedge onto the green according to 10 professional golfers. The evaluation criteria are as follows. The results shown in the Tables below are based on the fact that not less than 8 out of 10 professional golfers evaluated with the same criterion about each test item.

Evaluation Criteria:

○: The golf ball easily stops on the green because of a feel of being in contact with the club face and good ease of spinning, and the controllability is good.

Δ: Spin is slightly put on the golf ball, but is insufficient.

x: The golf ball does not easily stop on the green because the golf ball is not in contact with the club face (feel of slipping), and the controllability is poor.

xx: The golf ball does not stop on the green because spin is hardly put on the golf ball, and the controllability is very poor.

TABLE 3

|  | Example No. | | | |
| --- | --- | --- | --- | --- |
|  | 1 | 2 | 3 | 4 |
| Ball compression | 87 | 85 | 91 | 83 |
| Rebound coefficient | 0.780 | 0.775 | 0.787 | 0.771 |
| Durability (index) | 180 | 200 | 150 | 250 |
| Spin amount | | | | |
| No. 5 iron club (rpm) | 4800 | 5000 | 4800 | 5300 |

TABLE 3-continued

|  | Example No. | | | |
| --- | --- | --- | --- | --- |
|  | 1 | 2 | 3 | 4 |
| No. 9 iron club (rpm) | 7600 | 8000 | 7500 | 8400 |
| Run by sand wedge (cm) | 80 | 40 | 80 | 30 |
| Shot feel at the time of approach | ○ | ○ | ○ | ○ |
| Controllability at the time of approach | ○ | ○ | ○ | ○ |
| Flight distance (yard) | 237 | 235 | 240 | 232 |

TABLE 4

|  | COmparative Example No. | | | | |
| --- | --- | --- | --- | --- | --- |
|  | 1 | 2 | 3 | 4 | 5 |
| Ball compression | 102 | 86 | 84 | 104 | 85 |
| Rebound coefficient | 0.780 | 0.762 | 0.758 | 0.781 | 0.759 |
| Durability (index) | 100 | 170 | 190 | 90 | 180 |
| Spin amount | | | | | |
| No. 5 iron club (rpm) | 3600 | 4700 | 4900 | 3550 | 4850 |
| No. 9 iron club (rpm) | 6000 | 7500 | 7900 | 5950 | 7850 |
| Run by sand wedge (cm) | 270 | 90 | 60 | 280 | 70 |
| Shot feel at the time of approach | xx | x | Δ | xx | Δ |
| Controllability at the time of approach | xx | Δ | ○ | xx | ○ |
| Flight distance (yard) | 237 | 225 | 222 | 238 | 222 |

As is apparent from the results shown in Tables 3 and 4, the golf balls of Examples 1 to 4 had good shot feel and controllability, high rebound characteristics, good flight performance and excellent durability. That is, the golf balls of Examples 1 to 4 showed good shot feel because of good evaluation of the shot feel at the time of approach, little run by a sand wedge, good controllability because of good evaluation of the controllability at the time of approach. Furthermore, the rebound efficient is high and the rebound characteristics are good, same flight distance as that of the golf ball using only a high rigid ionomer as the resin component of the cover, good flight performance and excellent durability because of high index value of the durability.

To the contrary, the golf ball of Comparative Example 1 is a conventional standard two-piece solid golf ball which is a golf ball as a criterion for comparison. This golf ball of Comparative Example 1 attained large flight distance such as 237 yard because only a high rigid ionomer is used as the resin component of the cover, but the shot feel and controllability were very poor. Furthermore, the golf balls of Comparative Examples 2 to 3 attained small flight distance because a conventional low rigid ionomer is used in the resin component of the cover, and the flight performance was poor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A golf ball comprising a core and a cover covering the core, wherein the cover contains (A) an ionomer, prepared by neutralizing a terpolymer of ethylene, acrylic or methacrylic acid and an acrylic ester with magnesium ion, and (B) both an ethylene-methacrylic acid copolymer ionomer neutralized with sodium ion and an ethylene-methacrylic acid copolymer ionomer neutralized with zinc ion, the ionomer A has a Shore D scale hardness of from 20 to 50 and a stiffness modulus of 10 to 50 MPa, a weight ratio of ionomer A: ionomer B is within the range of from 85:15 to 20:80, and the cover has a Shore D scale hardness of from 35 to 60.

2. The ball according to claim 1, wherein the cover is multi-layered and at least one layer of the cover contains the ionomer A and the ionomer B.

3. The golf ball according to claim 1, wherein the core is either a solid core or a thread wound core.

4. The golf ball according to claim 1, wherein the cover has a thickness of 1 to 4 mm.

5. The golf ball according to claim 2, wherein the core is either a solid core or a thread wound core.

6. The golf ball according to claim 2, wherein the cover has a thickness of 1 to 4 mm.

* * * * *